United States Patent
Rishe

(10) Patent No.: US 12,158,525 B2
(45) Date of Patent: Dec. 3, 2024

(54) SYSTEMS AND METHODS FOR TERRAIN MAPPING USING LIDAR

(71) Applicant: Naphtali D. Rishe, Miami, FL (US)

(72) Inventor: Naphtali D. Rishe, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 473 days.

(21) Appl. No.: 17/358,795

(22) Filed: Jun. 25, 2021

(65) Prior Publication Data

US 2022/0413146 A1    Dec. 29, 2022

(51) Int. Cl.
| | |
|---|---|
| *G01S 17/89* | (2020.01) |
| *G06F 16/29* | (2019.01) |
| *G06T 17/05* | (2011.01) |
| *G06V 20/13* | (2022.01) |

(52) U.S. Cl.
CPC .............. *G01S 17/89* (2013.01); *G06F 16/29* (2019.01); *G06T 17/05* (2013.01); *G06V 20/13* (2022.01)

(58) Field of Classification Search
CPC ......... G01S 17/89; G06F 16/29; G06T 17/05; G06V 20/13; G06V 20/182; G06V 20/176; Y02A 90/10; B60W 60/001
USPC ................................................. 701/409, 532
See application file for complete search history.

(56) References Cited

U.S. PATENT DOCUMENTS

| | | | | |
|---|---|---|---|---|
| 2009/0304236 | A1* | 12/2009 | Francini | G06T 17/05 |
| 2010/0217529 | A1* | 8/2010 | Stroila | G09B 29/008 |
| 2017/0276482 | A1* | 9/2017 | Sane | G01C 15/002 |
| 2020/0082611 | A1* | 3/2020 | Haramaty | G06T 17/05 |
| 2020/0333466 | A1* | 10/2020 | Hansen | G05D 1/0212 |
| 2021/0001877 | A1* | 1/2021 | Han | G01C 21/3822 |
| 2021/0200801 | A1* | 7/2021 | Agrawal | G06F 16/219 |
| 2022/0128695 | A1* | 4/2022 | Koger | G01S 17/42 |

FOREIGN PATENT DOCUMENTS

| | | | | |
|---|---|---|---|---|
| CN | 101777189 B | * | 7/2012 | |
| CN | 108230329 A | * | 6/2018 | G06K 9/6268 |

OTHER PUBLICATIONS

Machine Translation of CN-108230329-A;"Semantic segmenting method based on multi-scale convolutional neural network"; Sun et al, Published on:Jun. 29, 2018 (Year: 2018).*

* cited by examiner

*Primary Examiner* — Ramon A. Mercado
*Assistant Examiner* — Ellis B. Ramirez
(74) *Attorney, Agent, or Firm* — SALIWANCHIK, LLOYD & EISENSCHENK

(57) ABSTRACT

Systems and methods for generating ground-level terrain elevation models, preparing vector street data to assist in generating such models, and finding approximate elevation of any point using such terrain models are provided. Lidar data can be analyzed, and Lidar elevation values at roadway/ street intersections can be used to determine a model of the ground-level elevation in an area or region. Outliers can be removed. The ground-level elevation at any point in the mapped area can be determined using elevation levels for nearby roadway intersections.

20 Claims, 16 Drawing Sheets

| Street segment name | Start latitude | Start longitude | End latitude | End longitude |
|---|---|---|---|---|
| Collins Ave | 25.813088 | -80.122996 | 25.81377 | -80.1229 |
| 42nd St | 25.813667 | -80.122049 | 25.81377 | -80.1229 |
| Collins Ave | 25.813768 | -80.1228907 | 25.81446 | -80.1228 |
| W 43rd St | 25.814355 | -80.121983 | 25.81446 | -80.1228 |
| Collins Ave | 25.812662 | -80.12306 | 25.81309 | -80.123 |
|  | 25.8136363 | -80.121697 | 25.81364 | -80.1217 |
|  | 25.8129318 | -80.1218104 | 25.81364 | -80.1217 |
| 42nd St | 25.813768 | -80.1228907 | 25.81387 | -80.1237 |
| Indian Creek Dr | 25.8133841 | -80.1238509 | 25.81387 | -80.1237 |
|  | 25.8153263 | -80.121396 | 25.81337 | -80.1217 |
| W 41st St | 25.813088 | -80.122996 | 25.81299 | -80.1222 |
|  | 25.8136398 | -80.1217185 | 25.81433 | -80.1216 |
| Indian Creek Dr | 25.8145672 | -80.1237034 | 25.81389 | -80.1238 |
| 42nd St | 25.8138743 | -80.1236766 | 25.81389 | -80.1238 |
|  | 25.8143266 | -80.1216109 | 25.81432 | -80.1216 |
| Indian Creek Dr | 25.8138743 | -80.1236766 | 25.81455 | -80.1236 |
| W 43rd St | 25.814461 | -80.1227861 | 25.81455 | -80.1236 |
| Arthur Godfrey Road | 25.813088 | -80.122996 | 25.81316 | -80.1235 |
| Indian Creek Dr | 25.815463 | -80.1236095 | 25.81457 | -80.1237 |
| W 43rd St | 25.8145503 | -80.1235693 | 25.81457 | -80.1237 |

FIG. 10

| name | latitude | longitude |
|---|---|---|
| 42nd Street;Collins Avenue | 25.8137748 | -80.1229012 |
| West 43rd Street; Collins Avenue | 25.8144624 | -80.1227929 |
| 41st Street;Collins Avenue | 25.8131003 | -80.1230061 |
| 42nd Street; Indian Creek Drive | 25.8138794 | -80.1236872 |
| Beach Access;Mid Beach Wooden Boardwalk (No Bikes) | 25.8142974 | -80.1216085 |
| Indian Creek Drive;42nd Street | 25.8138952 | -80.1238113 |
| West 43rd Street; Indian Creek Drive | 25.8145605 | -80.1235814 |
| Indian Creek Drive;no_name | 25.8136443 | -80.1238849 |
| Beach Access;no_name | 25.8142677 | -80.1214222 |
| Indian Creek Drive; West 43rd Street | 25.8145753 | -80.1237132 |
| Mid Beach Wooden Boardwalk (No Bikes);no_name | 25.8128987 | -80.121839 |
| 41st Street; Indian Creek Drive | 25.8132572 | -80.1239138 |
| Indian Creek Drive;41st Street | 25.8132735 | -80.1239931 |
| no_name | 25.8128856 | -80.1216047 |
| no_name | 25.8143554 | -80.1210743 |
| Indian Creek Drive;no_name | 25.8130507 | -80.1240504 |
| 40th Street;Collins Avenue | 25.8124239 | -80.1231066 |
| no_name | 25.8131337 | -80.1211524 |
| 41st Street;no_name | 25.8133367 | -80.1242668 |
| no_name | 25.8128681 | -80.1212145 |

FIG. 11

| name | LIDAR ft | latitude | longitude |
|---|---|---|---|
| 42nd Street;Collins Avenue | 2.5 | 25.81377 | -80.1229 |
| West 43rd Street;Collins Avenue | 3.1 | 25.81446 | -80.1228 |
| 41st Street;Collins Avenue | 2.1 | 25.8131 | -80.123 |
| 42nd Street;Indian Creek Drive | 3.2 | 25.81388 | -80.1237 |
| Beach Access;Mid Beach Wooden Boardwalk (No Bikes) | 11.2 | 25.8143 | -80.1216 |
| Indian Creek Drive;42nd Street | 2.3 | 25.8139 | -80.1238 |
| West 43rd Street;Indian Creek Drive | 2.6 | 25.81456 | -80.1236 |
| Indian Creek Drive;no_name | 3.9 | 25.81364 | -80.1239 |
| Beach Access;no_name | 7.1 | 25.81427 | -80.1214 |
| Indian Creek Drive;West 43rd Street | 2.1 | 25.81458 | -80.1237 |
| Mid Beach Wooden Boardwalk (No Bikes);no_name | 11.1 | 25.8129 | -80.1218 |
| 41st Street;Indian Creek Drive | 4.6 | 25.81326 | -80.1239 |
| Indian Creek Drive;41st Street | 6.2 | 25.81327 | -80.124 |
| no_name | 7.1 | 25.81289 | -80.1216 |
| no_name | 1.1 | 25.81436 | -80.1211 |
| Indian Creek Drive;no_name | 5.1 | 25.81305 | -80.1241 |
| 40th Street;Collins Avenue | 1.9 | 25.81242 | -80.1231 |
| no_name | -1.8 | 25.81313 | -80.1212 |
| 41st Street;no_name | 9.6 | 25.81334 | -80.1243 |
| no_name | -1.5 | 25.81287 | -80.1212 |

FIG. 12

| links to locations & details | Street Names | LIDAR (feet) |
|---|---|---|
| 1: k193 | West 42nd Street;Sheridan Avenue | 2.6 |
| 2: k207 | West 42nd Street;Pine Tree Drive | 5.1 |
| 3: k210 | no_name;Sheridan Avenue | 2.3 |
| 4: k290 | 41st Street;Tree Drive | 5.3 |
| 5: k317 | 41st Street;Pine Tree Drive | 6.2 |
| 6: k322 | 41st Street;Sheridan Avenue | 3.4 |
| 7: k440 | West 43rd Street;Sheridan Avenue | 2.5 |
| 8: k446 | no_name | 53.1 |
| 9: k447 | no_name | 43.9 |
| 10: k455 | Flamingo Drive;Pine Tree Drive | 5.6 |
| 11: k677 | no_name;Flamingo Drive | 5.1 |
| 12: k647 | no_name;West 40th Street;Tree Drive;Pine Tree Drive | 5.5 |
| 13: k693 | West 40th Street;Sheridan Avenue | 3.5 |
| 14: k727 | Royal Palm Avenue;West 42nd Street | 2.6 |
| 15: k742 | no_name;Royal Palm Avenue | 2.4 |
| 16: k747 | no_name;Royal Palm Avenue | 2.6 |
| 17: k783 | no_name | 2.6 |
| 18: k790 | no_name | 3.5 |
| 19: k797 | no_name | 3.1 |
| 20: k803 | 41st Street;Royal Palm Avenue | 3.0 |

FIG. 13

| links to locations & details | Street Names | LIDAR (feet) |
|---|---|---|
| 1: K193 | West 42nd Street;Sheridan Avenue | 2.6 |
| 2: K207 | West 42nd Street;Pine Tree Drive | 5.1 |
| 3: K260 | 41st Street;Tree Drive | 5.2 |
| 4: K317 | 41st Street;Pine Tree Drive | 6.2 |
| 5: K323 | 41st Street;Sheridan Avenue | 3.4 |
| 6: K440 | West 43rd Street;Sheridan Avenue | 2.5 |
| 7: K453 | Flamingo Drive;Pine Tree Drive | 5.6 |
| 8: K683 | West 40th Street;Sheridan Avenue | 3.5 |
| 9: K727 | Royal Palm Avenue;West 42nd Street | 2.6 |
| 10: K803 | 41st Street;Royal Palm Avenue | 3.8 |
| 11: K813 | Royal Palm Avenue;West 43rd Street | 2.2 |
| 12: K880 | West 44th Street;Pine Tree Drive | |
| 13: K893 | West 44th Street;Sheridan Avenue | 3.1 |
| 14: K903 | Post Avenue;West 42nd Street | 2.5 |
| 15: K960 | Post Avenue;West 43rd Street | 2.5 |
| 16: K997 | West 40th Street;Royal Palm Avenue | 2.2 |
| 17: K1027 | West 44th Street;Royal Palm Avenue | 1.8 |
| 18: K1060 | Indian Creek Drive;42nd Street | 2.3 |
| 19: K1070 | Indian Creek Drive;41st Street | 6.2 |
| 20: K1073 | Indian Creek Drive;West 43rd Street | 2.1 |

FIG. 14A

| links to locations & details | Street Names | LIDAR (feet) |
|---|---|---|
| 21: x1097' | 41st Street;Indian Creek Drive | 4.6 |
| 22: x1100' | 42nd Street;Indian Creek Drive | 3.2 |
| 23: x1117' | West 43rd Street;Indian Creek Drive | 2.5 |
| 24: x1140' | 40th Street;Indian Creek Drive | 2.8 |
| 25: x1183' | West 42nd Street;Prairie Avenue | 2.2 |
| 26: x1219' | 41st Street;Prairie Avenue | 4.1 |
| 27: x1247' | Post Avenue;West 44th Street | 1.9 |
| 28: x1253' | Indian Creek Drive;44th Street;Collins Avenue | 5 |
| 29: x1257' | 39th Street;Indian Creek Drive | 2.1 |
| 30: x1307' | 44th Street;Collins Avenue;Indian Creek Drive | 3.6 |
| 31: x1330' | West 40th Street;Prairie Avenue | 3.3 |
| 32: x1330' | West 37th Street;Pine Tree Drive | 31.8 |
| 33: x1367' | 42nd Street;Collins Avenue | 2.5 |
| 34: x1380' | West 43rd Street;Collins Avenue | 3.1 |
| 35: x1380' | West 37th Street;Sheridan Avenue | 3.2 |
| 36: x1400' | 41st Street;Collins Avenue | 2.1 |
| 37: x1440' | 38th Street;Indian Creek Drive | 2.3 |
| 38: x1477' | 40th Street;Collins Avenue | 1.9 |
| 39: x1520' | West 37th Street;Royal Palm Avenue | 2.5 |
| 40: x1523' | West 44th Street;Prairie Avenue | 2.2 |

FIG. 14B

| links to locations & details | Street Names | LIDAR (feet) |
|---|---|---|
| 1: >349' | West 37th Street; Sheridan Avenue | 3.2 |
| 2: <373' | West 37th Street; Royal Palm Avenue | 2.5 |
| 3: >399' | West 34th Street; Sheridan Avenue | 3.8 |
| 4: <420' | West 34th Street; Royal Palm Avenue | 2.4 |
| 5: <697' | West 37th Street; Prairie Avenue | 3.2 |
| 6: >703' | West 34th Street; Pine Tree Drive | 4.2 |
| 7: <727' | West 34th Street; Prairie Avenue | 2.7 |
| 8: >1000' | Flamingo Drive; West 35th Street | 4.5 |
| 9: <1003' | West 40th Street; Royal Palm Avenue | 2.2 |
| 10: >1033' | West 40th Street; Sheridan Avenue | 3.5 |
| 11: <1047' | Chase Avenue | 2.3 |

FIG. 15

SYSTEMS AND METHODS FOR TERRAIN MAPPING USING LIDAR

GOVERNMENT SUPPORT

This invention was made with government support under Grant 2018611 awarded by National Science Foundation (NSF). The government has certain rights in the invention.

BACKGROUND

Lidar (also written Lidar, LiDAR, or LADAR) (laser imaging, detection, and ranging; a combination of "light" and "RADAR") is a remote sensing technology that measures distance by illuminating a target with a laser and analyzing the reflected light. Lidar is popularly used as a technology to make high-resolution maps, with applications in geodesy, geomatics, archaeology, geography, geology, geomorphology, seismology, forestry, remote sensing, atmospheric physics, airborne laser swath mapping (ALSM), laser altimetry, and contour mapping.

Lidar uses ultraviolet, visible, or near-infrared light to image objects. It can target a wide range of materials, including non-metallic objects, rocks, rain, chemical compounds, aerosols, and clouds. A narrow laser beam can map physical features with very high resolutions; for example, an aircraft can map terrain at 30 cm resolution or better. Lidar instruments fitted to aircraft and satellites can carry out surveying and mapping.

In Lidar, wavelengths can vary to suit the target—from about 10 micrometers to the UV range of approximately 250 nm. Typically, light is reflected via backscattering, and different types of scattering can be used for different Lidar applications, most commonly Rayleigh scattering, Mie scattering, Raman scattering, and fluorescence. Based on different kinds of backscattering, the Lidar can be accordingly called Rayleigh Lidar, Mie Lidar, Raman Lidar, Na/Fe/K Fluorescence Lidar, and so on. Suitable combinations of wavelengths can allow for remote mapping of atmospheric contents by identifying wavelength-dependent changes in the intensity of the returned signal.

In general, there are two kinds of Lidar detection schemes: "incoherent", or direct energy detection, which is principally an amplitude measurement, and coherent detection, which is best for Doppler or phase-sensitive measurements. Coherent systems generally use optical heterodyne detection, which is more sensitive than direct detection and thus allows operation at much lower power but at the expense of more complex transceiver requirements.

In both coherent and incoherent Lidar, there are two types of pulse models: micropulse Lidar systems; and high energy systems. Micropulse systems have developed as a result of the ever-increasing amount of computer power available, combined with advances in laser technology. They use considerably less energy in the laser, typically on the order of one microjoule (µJ), and are often "eye-safe", meaning they can be used without safety precautions. High-power systems are common in atmospheric research, where they are widely used for measuring many atmospheric parameters, including the height, layering, and densities of clouds, cloud particle properties (extinction coefficient, backscatter coefficient, depolarization), temperature, pressure, wind, humidity, and trace gas concentration (e.g., ozone, methane, nitrous oxide).

BRIEF SUMMARY

Embodiments of the subject invention provide novel and advantageous systems and methods for generating ground-level terrain elevation models, preparing vector street data to assist in generating such models, and finding an approximate elevation of any point using such terrain models. Lidar data can be analyzed, and Lidar elevation values at roadway/street intersections can be used to determine a model of the ground-level elevation in an area or region. Outliers can be removed. The ground-level elevation at any point in the mapped area can be determined using the ground-level elevation values for nearby intersections.

In an embodiment, a system for generating a ground-level terrain elevation model of a physical area can comprise a processor and a (non-transitory) machine-readable medium in operable communication with the processor and having instructions stored thereon that, when executed by the processor, perform the following steps: receiving a set of data (e.g., a raw dataset) comprising Lidar-measured elevation data for the physical area (e.g., at the rooftop level); determining locations of roadway intersections in the physical area based on a street line dataset (e.g., a dataset of street line data); extracting the respective Lidar-measured elevation values for the roadway intersections (e.g., under the assumption that the rooftop elevation at the intersection equals the ground elevation); and removing or ameliorating any outliers from the Lidar-measured elevation values for the roadway intersections (e.g., to exclude the rare situations where there is a monument or a tree at the center of the intersection, making the ground elevation different from the rooftop elevation) to obtain the ground-level terrain elevation model of the Lidar-measured elevation values for the roadway intersections with outliers removed. The determining of locations of roadway intersections can comprise: analyzing streets and/or street lines, of the physical area, using the street line dataset of polylines comprising street segments; calculating respective distances between pairs of coordinates selected from the end-points of the segments of the polylines; and determining the locations of roadway intersections based on the respective distances. The calculating of the respective distances ($D_{LL}$) between pairs of coordinates can comprise using the equation for $D_{LL}$ discussed herein. The instructions when executed can further determine a ground-level elevation at a target point (e.g., any target point) using the (ameliorated) Lidar-measured elevation values for a plurality of roadway intersections within a predetermined radius of the target point, the Lidar-measured elevation values being weighted according to respective distances from the target point. The ground-level elevation at the target point ($E_{tp}$) can be determined using the equation for $E_{tp}$ presented herein (n can be, for example, at least 4). The predetermined radius can be, for example, 1 mile or more. The removing or ameliorating of any outliers can comprise categorizing a Lidar-measured elevation value for a roadway intersection as an outlier if it is higher than an average of the Lidar-measured elevation values for the (nearby) roadway intersection by at least a predetermined threshold (e.g., 200%). The ameliorating can comprise determining a ground-level elevation, at a roadway intersection with an outlier Lidar-measured elevation value, using nearby Lidar-measured elevation values for a plurality of roadway intersections within a predetermined radius of the outlier intersection, the nearby Lidar-measured elevation values being weighted according to respective distances from the respective roadway intersections to the outlier intersection (e.g., the equation for $E_{td}$ can be used, where the roadway intersection with the outlier Lidar-measured elevation value can be the target point). The set of data comprising Lidar-measured elevation data can be obtained from a database, at least one Lidar sensor (e.g., as part of the system, and the sensor can be on an airborne vehicle), or both.

In another embodiment, a method for generating a ground-level terrain elevation model of a physical area can comprise: receiving (e.g., by a processor) a set of data comprising Lidar-measured elevation data for the physical area; determining (e.g., by the processor) locations of roadway intersections in the physical area based on the set of data, as well as the respective Lidar-measured elevation values for the roadway intersections; and removing or ameliorating (e.g., by the processor) any outliers from the Lidar-measured elevation values for the roadway intersections to obtain the ground-level terrain elevation model of the Lidar-measured elevation values for the roadway intersections with outliers removed. The determining of locations of roadway intersections can comprise: analyzing (e.g., by the processor) streets, of the physical area, in the set of data as respective polylines comprising segments; calculating (e.g., by the processor) respective distances between pairs of coordinates selected from the segments of the polylines; and determining (e.g., by the processor) the locations of roadway intersections based on the respective distances. The calculating of the respective distances ($D_{LL}$) between pairs of coordinates can comprise using the equation for $D_{LL}$ discussed herein. The method can further comprise determining a ground-level elevation at a target point using Lidar-measured elevation values for a plurality of roadway intersections within a predetermined radius of the target point, the Lidar-measured elevation values being weighted according to respective distances from the target point. The ground-level elevation at the target point ($E_{tp}$) can be determined using the equation for $E_{tp}$ presented herein (n can be, for example, at least 4). The predetermined radius can be, for example, 1 mile. The removing or ameliorating of any outliers can comprise categorizing a Lidar-measured elevation value for a roadway intersection as an outlier if it is higher than an average of the (nearby) Lidar-measured elevation values for the roadway intersection by at least a predetermined threshold (e.g., 200%). The ameliorating can comprise determining a ground-level elevation, at a roadway intersection with an outlier Lidar-measured elevation value, using nearby Lidar-measured elevation values for a plurality of roadway intersections within a predetermined radius of the target point, the nearby Lidar-measured elevation values being weighted according to respective distances from the roadway intersection with the outlier Lidar-measured elevation value (e.g., the equation for $E_{td}$ can be used, where the roadway intersection with the outlier Lidar-measured elevation value can be the target point). The set of data comprising Lidar-measured elevation data can be obtained from a database, at least one Lidar sensor (e.g., on an airborne vehicle), or both.

BRIEF DESCRIPTION OF DRAWINGS

As seen in FIG. 6, a tree overhangs the intersection where the elevation was taken, leading to such an elevation outlier.

FIG. 10 shows a table of street segments, with their endpoint coordinates, comprising a portion of a street line dataset comprised of segments.

FIG. 11 shows a table of coordinates of roadway/street intersections.

FIG. 12 shows a table of the intersections of Table 11, along with the Lidar data point measurement at each intersection.

FIG. 13 shows a user-friendly representation of a table of Lidar-measured elevations at intersections/streets, with coordinate pairs visually replaced by directional arrows and distances to a central point.

FIGS. 14A and 14B combine to show a user-friendly representation of a table of Lidar-measured elevations at intersections/streets.

FIG. 15 shows a table of Lidar-measured elevations at intersections/streets near a target point for which ground-level elevation needs to be computed; each row of the table shows the distance from the intersection to said target point; in estimating the elevation at said target point, the elevations at nearby intersections are compared with weights that are inverse to the distances from the intersections to said target point.

DETAILED DESCRIPTION

Figure 1:
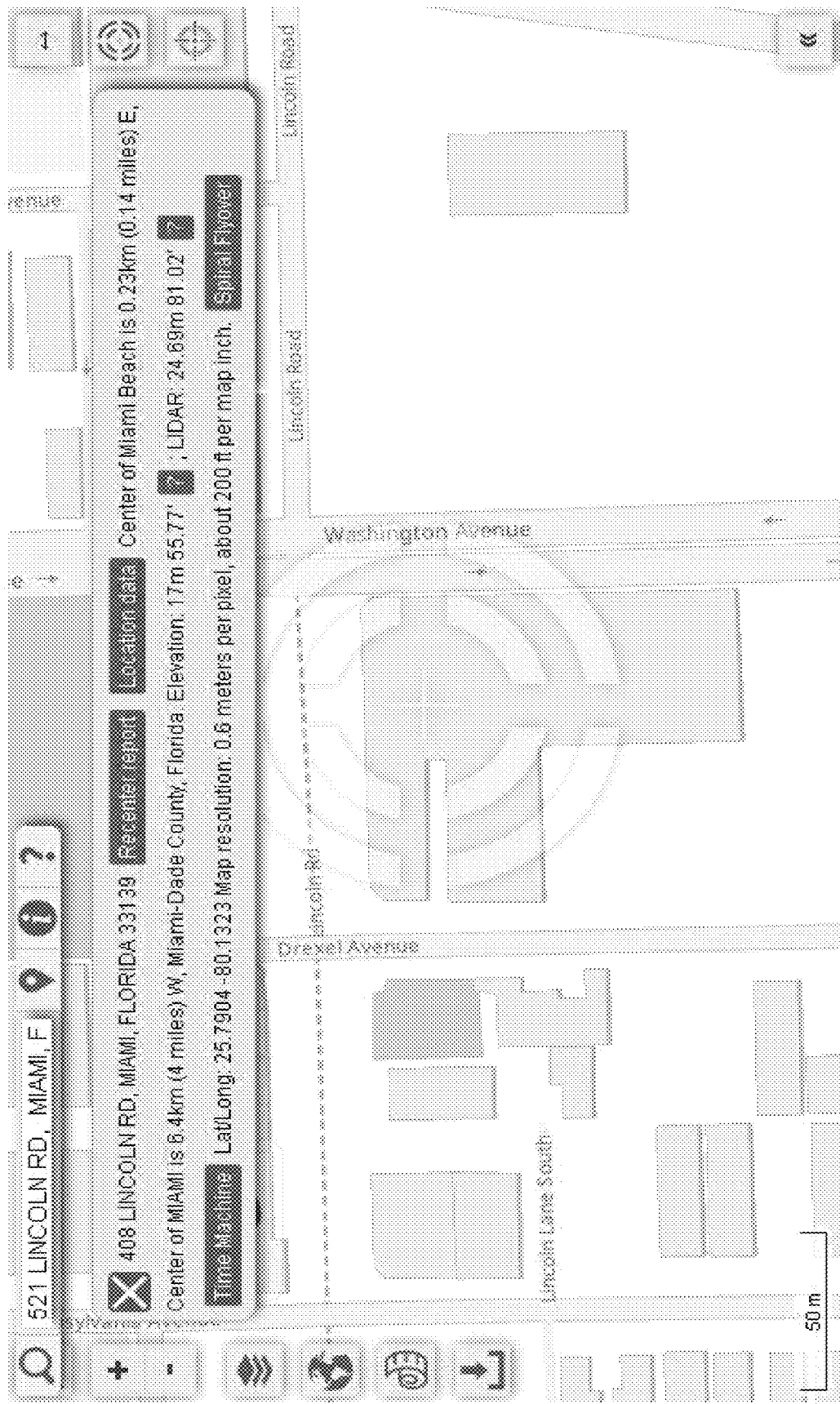
FIG. 1 shows a map with a Lidar measurement of a location in Miami Beach, FL, USA, which gives an elevation of 81 feet.

Embodiments of the subject invention provide novel and advantageous systems and methods for generating ground-level terrain elevation models, preparing vector street data to assist in generating such models, and finding the approximate elevation of any point using such terrain models. Lidar data can be analyzed, and Lidar elevation values at roadway/street intersections can be used to determine a model of the ground-level elevation in an area or region. Outliers can be removed. The ground-level elevation at any point in the mapped area can be determined using the process described herein for determining $E_{tp}$.

Embodiments of the subject invention can: extract/generate an approximation of a true ground-level terrain elevation model from Lidar data that is mostly rooftop in urban areas; prepare vector street data to help in the extraction of ground elevation from Lidar datasets; and/or determine the approximate ground-level elevation of any point in the area/region of the terrain elevation model, using the terrain elevation model. The Lidar data can be obtained from an existing database or can be measured using one or more Lidar sensors (e.g., on an airborne vehicle).

A Lidar system can include a laser, a scanner, optics, a photodetector, receiver electronics, and/or one or more position and navigation systems. The most common lasers for non-scientific applications are 600.1000 nanometer (nm) lasers. They are inexpensive, but because they can be focused and easily absorbed by the eye, the maximum power is limited by the need to make them eye-safe, as eye-safety is often a requirement for most applications. A common alternative, 1550 nm lasers, are eye-safe at much higher power levels because this wavelength is not focused by the eye, but the detector technology is less advanced, and so these wavelengths are generally used at longer ranges and lower accuracies. They are also used for military applications as 1550 nm is not visible in night vision goggles, unlike the shorter 1000 nm infrared laser. Airborne topographic mapping Lidars generally use 1064 nm diode-pumped YAG lasers, while bathymetric systems generally use 532 nm frequency-doubled diode-pumped YAG lasers because 532 nm penetrates water with much less attenuation than does 1064 nm. Laser settings include the laser repetition rate, which controls the data collection speed. Pulse length is generally an attribute of the laser cavity length, the number of passes required through the gain material (YAG, YLF, etc.), and Q-switch speed. Better target resolution is achieved with shorter pulses, provided the Lidar receiver detectors and electronics have sufficient bandwidth.

With respect to a scanner and/or optics, the speed at which images can be developed is also affected by the speed at which they are scanned. There are several options to scan the azimuth and elevation, including dual oscillating plane mirrors, a combination with a polygon mirror, and a dual-axis scanner. Optic choices affect the angular resolution and range that can be detected. A hole mirror or a beam splitter are options to collect a return signal.

With respect to a photodetector and/or receiver electronics, two main photodetector technologies are used in Lidars: solid-state photodetectors; such as silicon avalanche photodiodes; and photomultipliers. The sensitivity of the receiver is another parameter that has to be balanced in a Lidar design.

With respect to position and navigation systems, Lidar sensors that are mounted on mobile platforms such as airplanes or satellites require instrumentation to determine the absolute position and orientation of the sensor. Such devices generally include a global positioning system (GPS) receiver and/or an inertial measurement unit (IMU).

Three-dimensional (3D) imaging can be achieved using both scanning and non-scanning systems. 3D gated viewing laser radar is a non-scanning laser ranging system that applies a pulsed laser and a fast gated camera.

Imaging Lidar can also be performed using arrays of high-speed detectors and modulation sensitive detector arrays typically built on single chips using complementary metal-oxide semiconductor (CMOS) and hybrid CMOS/charge-coupled device (CCD) fabrication techniques. In these devices, each pixel performs some local processing such as demodulation or gating at high speed and/or down-converting the signals to video rate so that the array may be read like a camera. Using this technique, many thousands of pixels/channels may be acquired simultaneously. High-resolution 3D Lidar cameras can use homodyne detection with an electronic CCD or CMOS shutter. A coherent imaging Lidar system can use synthetic array heterodyne detection to enable a staring single element receiver to act as though it were an imaging array.

A major application of Lidar is in surveying. Airborne Lidar sensors can be used in the remote sensing field. They can be used to create a digital terrain model (DTM) or digital elevation model (DEM). This can be performed in larger areas as a plane can acquire, for example, a 3.4 kilometer (km) wide swath in a single flyover. Greater vertical accuracy of below 50 millimeters (mm) can be achieved with a lower flyover, even in forests, where it is able to give the height of the canopy as well as the ground elevation. Typically, a global navigation satellite system (GNSS) receiver configured over a georeferenced control point is needed to link the data in with the world geodetic system (WGS). In fact, it works a lot like ordinary RADAR, except that these systems send out narrow pulses or beams of light rather than broad radio waves.

In urban areas, most Lidar measurements with related art systems and methods hit rooftops and thus are not indicative of true elevation at the ground level. FIG. 1 shows a random Lidar measurement in flat Miami Beach, which is almost at sea level. The measurement shows an elevation of 81 feet and is plainly not indicative of the actual terrain (i.e., the true elevation at the ground level at that point).

Embodiments of the subject invention address these shortcomings by measuring (or obtaining measurements of) Lidar data at roadway intersections, where it is extremely unlikely that any tall structure would be present to give an inaccurate measure of the true elevation at the ground level. Rare exceptions exist, such as monuments at intersections or trees that extend over intersections. The only exception in FIG. 1 is at the intersection of Meridian Avenue and the pedestrian Lincoln Road, which has a Lidar-measured elevation of 22.9 feet. Embodiments of the subject invention can reduce, inhibit, or prevent such anomalies by detecting intersections where the Lidar data is significantly higher (e.g., by a threshold percentage, such as 200%) than that of all the nearby (e.g., within a particular radius, such as 1 mile) intersections and then examining the Lidar pixels in a small radius (e.g., 50 feet) from the intersection to detect whether there is a plurality of significantly lower points.

Despite the rare anomalies, the analysis of the Lidar points at intersections allows building an urban terrain model that is very accurate (e.g., about or approximately correct at each point). Once the model is built, the elevation at any point can be determined by examining the Lidar elevation values at a plurality of nearby intersections (e.g., two or more of the nearest intersections) and interpolating the result to arrive at the approximate elevation of the point in question.

Lidar data can be received as a raster dataset (i.e., a matrix of equidistant points (or pixels) without any reference to street vectors or intersections). Street vectors are available from many sources, such as the free source of OpenStreetMap (OSM) or premium datasets such as NavTeq. OSM is a collaborative project to create a free editable map of the world. Two major driving forces behind the establishment and growth of OSM have been restrictions on the use or availability of map information across much of the world and the advent of inexpensive portable satellite navigation devices. OSM is considered a prominent example of volunteered geographic information. OSM was created in 2004, inspired by the success of Wikipedia and the preponderance of proprietary map data in most industrialized countries. Since then, it has grown to over 2 million registered users, who can collect data using manual surveys, GPS devices, aerial photography, and other free sources. These crowd-sourced data are then made available under the Open Database License. The site is supported by the OSM Foundation, a non-profit organization. Rather than the map itself, the data generated by the OSM project are considered its primary output. The data are then available for use in both traditional applications, like its usage by Craigslist, OsmAnd, Geocaching, MapQuest Open, JMP statistical software, and Foursquare to replace Google Maps and more unusual roles like replacing default data included with GPS receivers. These data have been favorably compared with proprietary data sources, though data quality varies worldwide.

Figure 2:
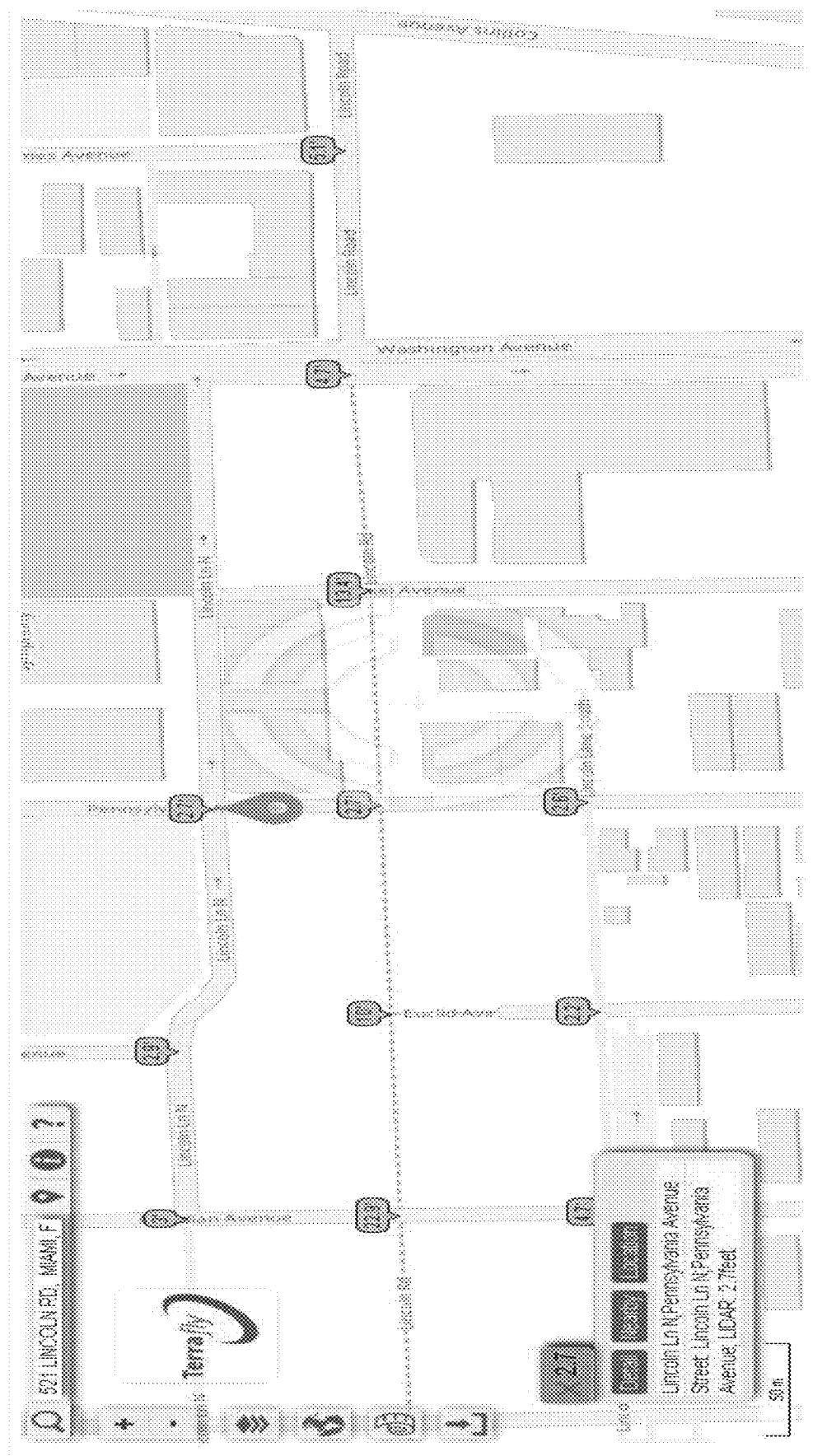
FIG. 2 shows a map of Lidar measurements of elevations at various intersections in Miami Beach. The elevations, shown in the bubbles, are (from left to right, top to bottom) 3 feet, 2.9 feet, 2.7 feet, 22.9 feet, 10 feet, 2.7 feet, 13.4 feet, 4.7 feet, 5.1 feet, 4.7 feet, 2.2 feet, and 2.6 feet.
Figure 3:
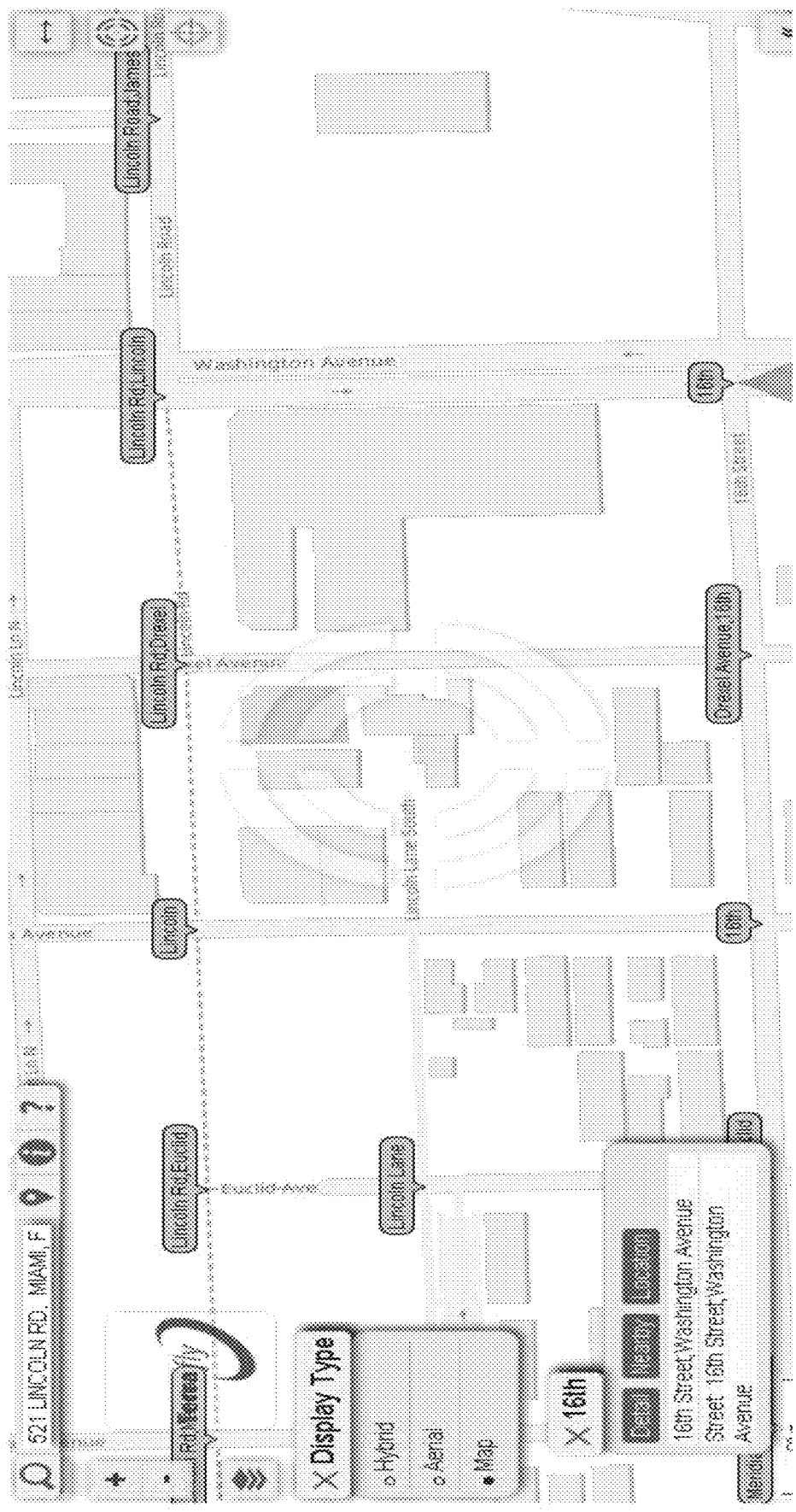
FIG. 3 shows a map similar to that of FIG. 2, but with names of streets or roadway/street intersections instead of Lidar measurements of elevations.

In many embodiments, the datasets of all intersections can be computed from street vectors via a spatial self-join of the dataset of street segments, resulting in point nodes comprising coordinates and a list of the names of streets (typically two streets) entering the intersection (see also FIGS. 2 and 3). Each intersection can be computed as a set of two or more segments where the beginning or the endpoint of the segment is located less than a given threshold (e.g., 30 feet) from the beginning or endpoint of a segment of another street.

The spatial join of the dataset of intersection and the raster Lidar dataset can be computed. For each intersection, the nearest Lidar measurement that is not father than a given threshold (e.g., 10 feet) can be identified. If there is a Lidar measurement found in such close proximity, said measurement can be associated with the intersection; otherwise, said intersection can be excluded from the terrain model.

Outliers in the values of the ground-level elevation can be eliminated from the dataset to get the final terrain model. An outlier can be defined as being significantly higher than the median of all elevations in an area (e.g., within a specified radius of the value considered as to whether it is an outlier or not; or within the entire area mapped) by a certain percentage (e.g., 50%, 100%, 150%, 200%, 250%, 300%, 350%, 400%, 450%, or 500%) or higher than the median of all elevations in an area (e.g., within a specified radius of the value considered as to whether it is an outlier or not; or within the entire area mapped), excluding the value being considered, by a certain percentage (e.g., 50%, 100%, 150%, 200%, 250%, 300%, 350%, 400%, 450%, or 500%). Alternatively to eliminating an outlier, the outlier can be ameliorated instead (e.g., by using the process described below to determine $E_{tp}$, where the outlier location is the target point) by estimating the ground-level elevation at the location of the outlier.

Figure 4:
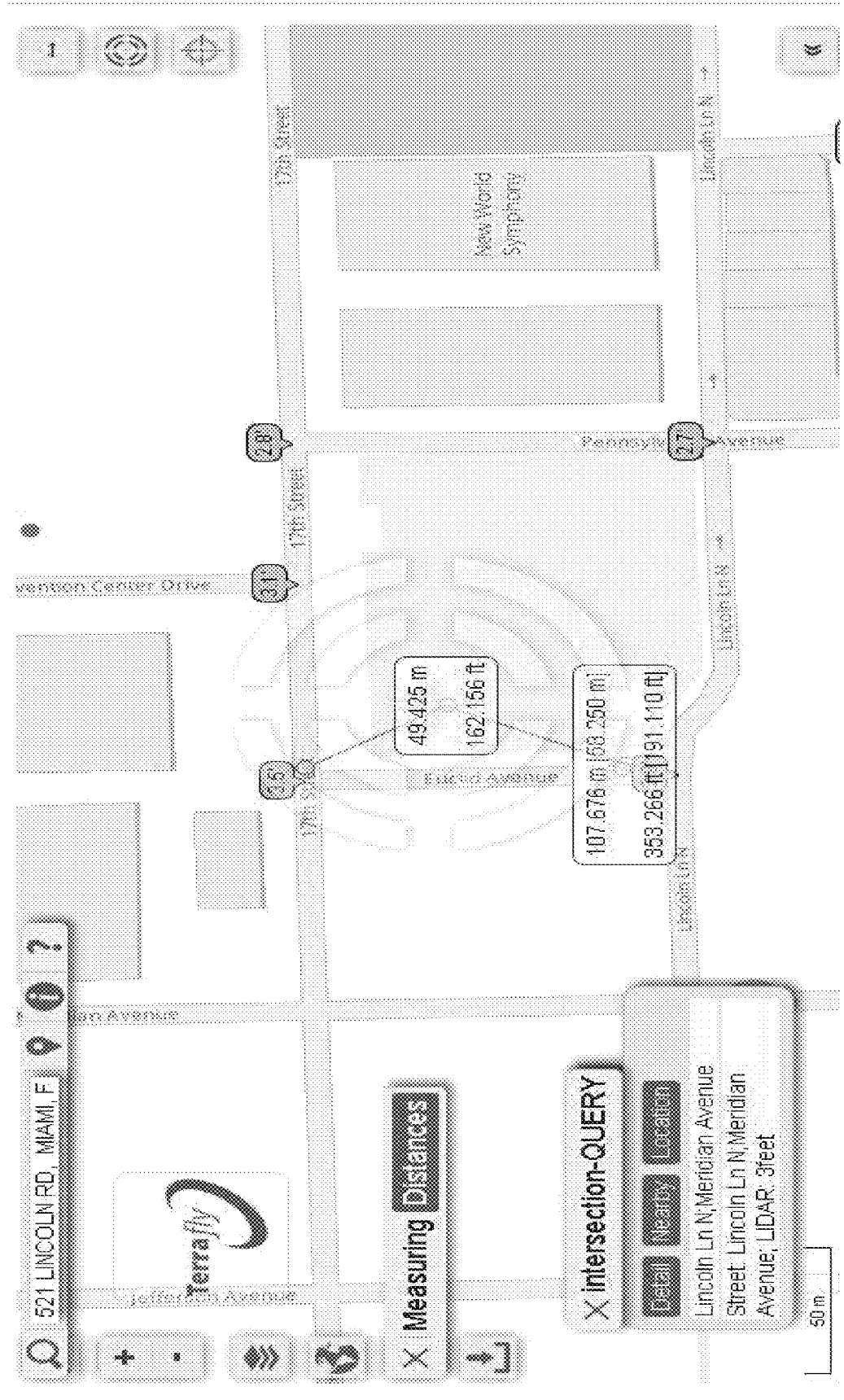
FIG. 4 shows a map demonstrating the estimating of a ground-level elevation at a desired (which can be otherwise arbitrary) point (shown here at a building with only a rooftop elevation available there directly from a Lidar measurement) by using Lidar measurements at intersections nearby to the desired point, where the Lidar values at the nearby intersections (here, 3.5 feet and 3.9 feet) are weighted according to the distances from the desired point to said intersections (here, 162 feet and 191 feet).

Once the terrain model of an area or region is obtained, the elevation of any arbitrary point can be estimated by examining the ground-level elevation of the nearest intersections and weighing their values (e.g., in reverse proportion to the distance from the subject point to said intersection) (see, e.g., FIG. 4).

Each street (either in the terrain model or before the terrain model is obtained or finalized) can be thought of as a polyline comprised of segments. FIG. 10 shows a table with an example of several such segments for streets in the Miami Beach, FL, USA area. Referring to FIG. 10, vertices of the segments of different streets that are within a given distance threshold from each other (e.g., 30 feet) can be located. The following equation (known from the prior art) can be used to compute the distance between two pairs of coordinates:

$$D_{LL}=R_E*\arccos[\cos(LAT1_{rad})*\cos(LAT2_{rad})*\cos(LONG1_{rad}-LONG2_{rad})+\sin(LAT1_{rad})*\sin(LAT2_{rad})]$$

where $$LAT1_{rad}=LAT1*(\pi/180)$$

$$LAT2_{rad}=LAT2*(\pi/180)$$

$$LONG1_{rad}=LONG1*(\pi/180)$$

$$LONG2_{rad}=LONG2*(\pi/180)$$

where $R_E$ is the radius of the Earth (i.e., $6.371229 \times 10^6$ meters), $LAT1_{rad}$ is the latitude of the first pair of coordinates in radians, $LONG1_{rad}$ is the longitude of the first pair of coordinates in radians, $LAT2_{rad}$ is the latitude of the second pair of coordinates in radians, $LONG2_{rad}$ is the longitude of the second pair of coordinates in radians, LAT1 is the latitude of the first pair of coordinates in degrees, LONG1 is the longitude of the first pair of coordinates in degrees, LAT2 is the latitude of the second pair of coordinates in degrees, LONG2 is the longitude of the second pair of coordinates in degrees, arccos is the arccosine function, cos is the cosine function, sin is the sine function, it is the ratio of a circle's circumference to its diameter (3.14159), and $D_{LL}$ is the distance between the first pair of coordinates ((LAT1, LONG1) or ($LAT1_{rad}$, $LONG1_{rad}$)) and the second pair of coordinates ((LAT2, LONG2) or ($LAT2_{rad}$, $LONG2_{rad}$)). The units of $D_{LL}$ will be the same as those used for $R_E$.

In order to estimate the elevation of any target point by examining the ground-level elevation of the nearest intersections and weighting their values, the following equation can be used.

$$E_{tp}=[(E_1/d_1+\ldots+E_n/d_n)/n]*[d_1+\ldots+d_n)/n]$$

where n is the number of intersections used in the estimation (an integer), $E_1$ is the ground-level elevation (via Lidar) for the first intersection of the n intersections, $E_2$ would be the ground-level elevation (via Lidar) for the second intersection of the n intersections, $E_n$, is the ground-level elevation (via Lidar) for the $n^{th}$ intersection of the n intersections, $d_1$ is the distance from the first intersection to the target point, $d_2$ would be the distance from the second intersection to the target point, $d_n$, is the distance from the $n^{th}$ intersection to the target point, and $E_{tp}$ is the ground-level elevation at the target point. The units of $E_{tp}$, will be the same as those used for the elevations/distances on the right side of the equation. The value of $E_{tp}$, (the estimated elevation) would be expected to be accurate within a fairly small tolerance (e.g., 20%, 15%, 10%, 5%, or even less). The value of n should be at least 2 and can depend on how many nearby intersections there are to the target point within a desired radius and for which the ground-level elevation values are known. For example, n can be 2, 3, 4, 5, 6, 7, 8, 9, 10, 11, 12, 13, 14, 15, 16, 17, 18, 19, 20, or even more. In some cases, n can be 1, if the target point is very close (e.g., within 10 feet) of the target point, but this is not preferred.

Embodiments of the subject invention address the technical problem of Lidar measurements often not reflecting the ground-level elevation (due to buildings, trees, and other structures being between the Lidar sensor and the ground in many cases) by providing the technical solution of utilizing Lidar elevation values at roadway/street intersections to determine a model of the ground-level elevation in an area. Outliers can be removed, as in some cases there will still be a tall structure over an intersection. The ground-level elevation at any point in the mapped area can be determined using the process described herein for determining $E_{tp}$.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 meter" means from 0.95 meters to 1.05 meters.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

The terrain of Miami Beach was modeled using the systems and methods of embodiments of the subject invention. A database of streets from OSM was utilized. Each street was first considered as a polyline comprised of segments; FIG. 10 shows a table of several such segments. From the data, vertices of segments of different streets that are within a given distance threshold from each other (30 feet) were located. The distances between pairs of coordinates were calculated according to the equation for $D_{LL}$ provided herein, and the list of intersections shown in the table in FIG. 11 was obtained. Next, the nearest available point in the Lidar dataset was located for each intersection, provided that the subject point was not farther than a given threshold (10 feet). These nearest available points are shown in the table in FIG. 12. This table does not include any notable outliers, so this table can be considered as a base for the final model of the ground-level elevation of the area, with the "LIDAR" column showing the respective elevations in feet at intersections.

Example 2

Figure 5:
FIG. 5 shows a map of Lidar measurements of elevations at various intersections in Miami Beach. The elevations, shown in the bubbles, are (from left to right, top to bottom) 2.5 feet, 2.2 feet, 2.5 feet, 2.2 feet, 3.1 feet, 3.5 feet, 53.1 feet, 5.1 feet, 2.6 feet, 2.5 feet, 4.1 feet, 3.4 feet, 5.2 feet, 6.2 feet, 5.6 feet, 2.2 feet, 3.5 feet, and 5.5 feet. The measurement of 53.1 feet is an outlier (in this case, pertaining to an end-point of a mall alley ending in a structure).

The data in the table shown in FIG. 13 was obtained for roads and intersections, with the first column in FIG. 13 signifying the distance (in feet) to a target location. Referring to FIG. 13, it can be seen that rows 8 and 9 include outliers, with elevations of 53.1 feet and 43.9 feet, respectively. These values are 475% and 376%, respectively, higher than the median of all 20 rows (including the two outliers) and 667% and 493%, respectively, higher than the median of the 19 rows excluding the respective outlier in each case. Thus, these two rows are removed from the dataset. As seen in FIG. 5, the elevation of 53.1 is for an unnamed street, and unnamed streets have a high chance of being outliers because they are often entryways into or under structures.

Figure 6:
FIG. 6 shows an image of a map with a Lidar rooftop measurement of an intersection in Miami Beach, which gives an elevation of 31.8 feet.

If unnamed streets were removed from the dataset of FIG. 5, most outliers would be eliminated, as shown in the table of FIGS. 14A and 14B. Referring to row 32 of FIG. 14B, this is also an outlier. In this case, it is because a tree covers the intersection at that point, as seen in the image in FIG. 6.

Figure 7:
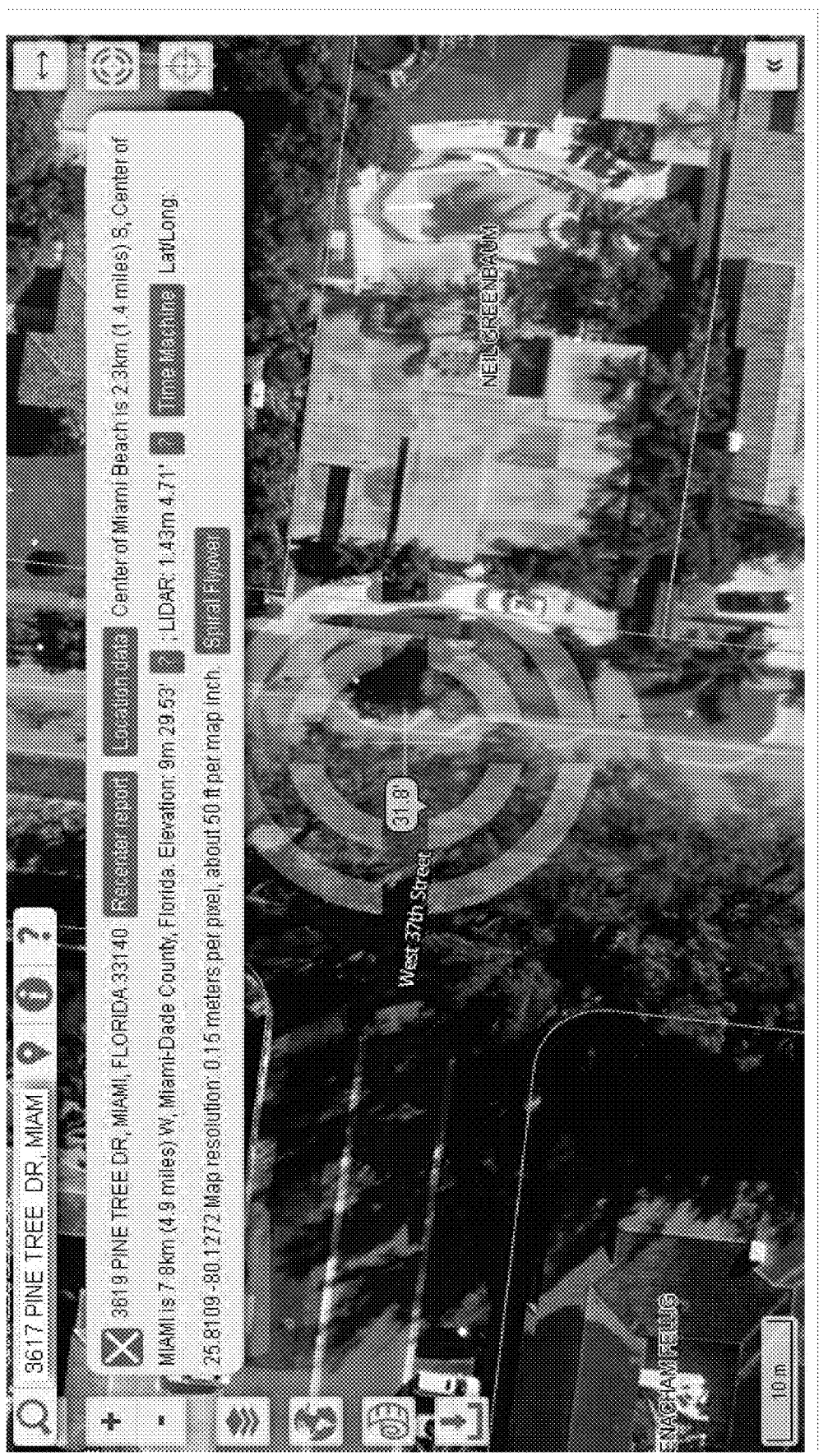
FIG. 7 shows an image of a map similar to that of FIG. 6, demonstrating how an actual ground-level elevation of the point in question can be obtained by utilizing nearby ground-level elevations.

Once this outlier is detected as being significantly higher than the neighboring intersections, it can either be removed or ameliorated. In order to ameliorate, all Lidar values within a predetermined radius (30 feet) from the center of the intersection can be considered to determine the actual ground-level elevation at the outlier point. In this case, a plurality of values of 4.7 feet is obtained (e.g., as at the point 20 feet east of the center of the intersection as seen in FIG. 7).

Figure 8:
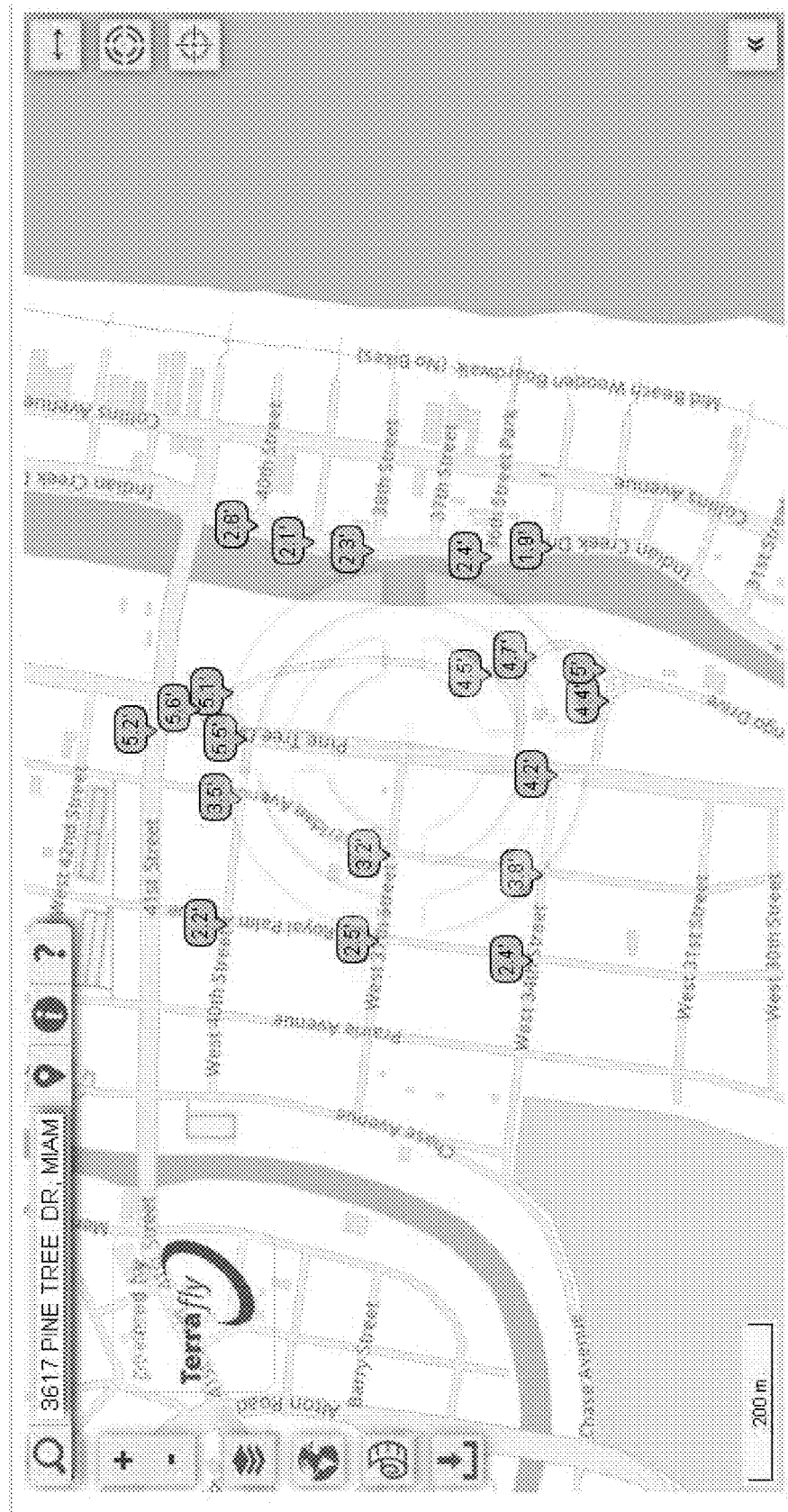
FIG. 8 shows a map of Lidar measurements of elevations at various intersections in Miami Beach. The elevations, shown in the bubbles, are (from left to right, top to bottom) 5.2 feet, 5.6 feet, 2.2 feet, 3.5 feet, 5.5 feet, 5.1 feet, 2.8 feet, 2.1 feet, 2.5 feet, 3.2 feet, 2.3 feet, 4.5 feet, 2.4 feet, 2.4 feet, 3.8 feet, 4.2 feet, 4.7 feet, 1.9 feet, 4.4 feet, and 5 feet.

After ameliorating the outlier of row 32 in FIG. 14B (and removing the outliers from rows 8 and 9 in FIG. 13), the map in FIG. 8 is obtained. This map can be considered as a base for the final model of the ground-level elevation of the area, with the bubbles showing the respective elevations in feet at the intersections.

Example 3

Figure 9:
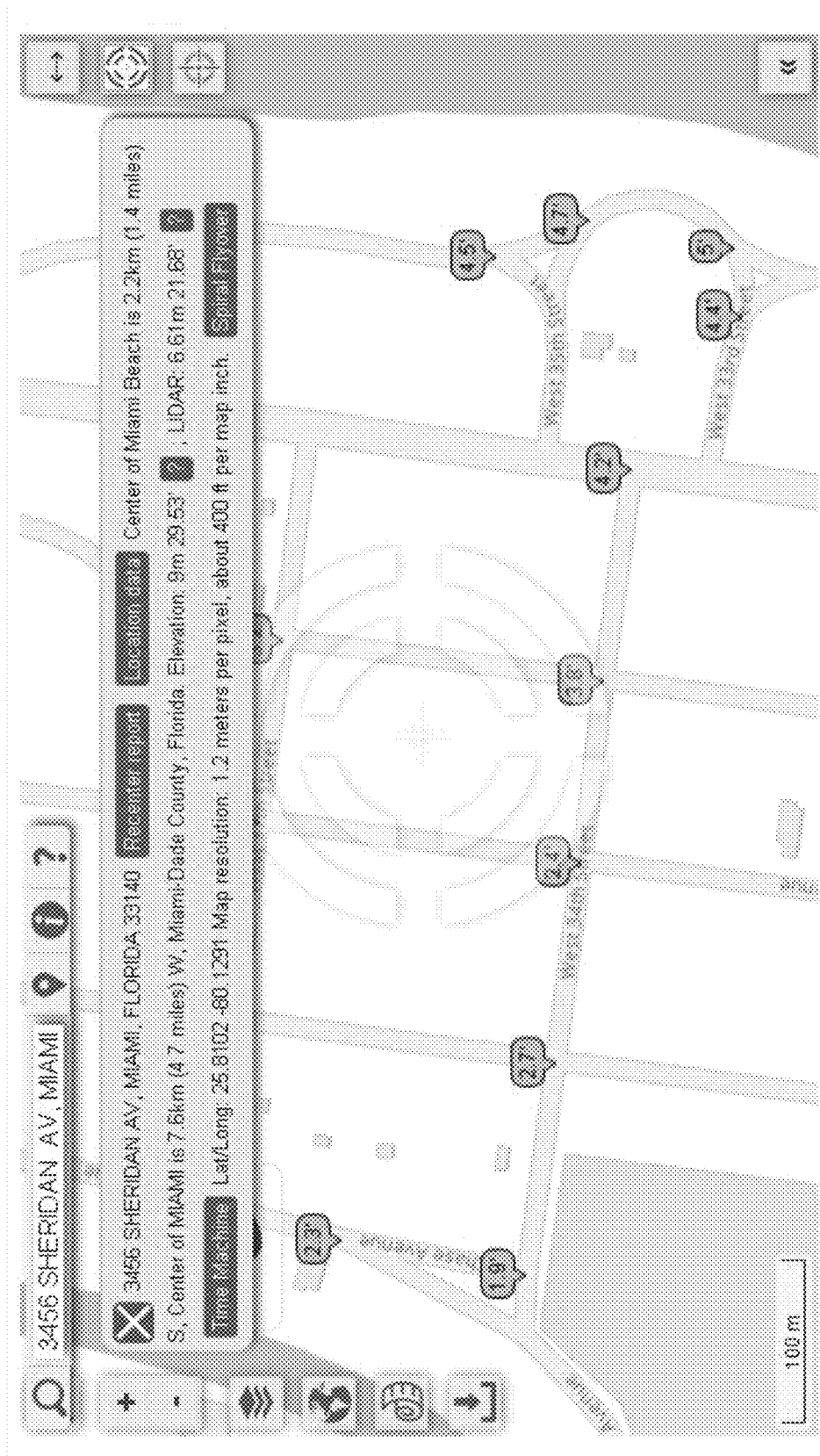
FIG. 9 shows a map of Lidar measurements and several intersections, as well as a rooftop Lidar measurement at a targeted location measured at 21.68 feet. This measurement came in high because it is a rooftop measurement. Embodiments of the subject invention can be used to determine an approximate ground-level elevation for the targeted location.

After developing an intersection-based ground elevation grid for the entire region (as in Examples 1 or 2), the ground elevation at any point in the region (e.g., non-intersection points) can be estimated. The elevation of the point in the center (in the target cross) in FIG. 9 was determined. The Lidar value of this point is 21.68 feet because it is a rooftop measurement. The nearby intersections and distances from the target point were ordered and considered to find the true ground-level elevation at the target point. The nearby intersections and distances thereto are shown in the table in FIG. 15, with the first column being the distances from the respective intersection to the target point.

The four nearest intersections were used (i.e., n=4), and the equation for $E_{tp}$ presented herein was used, as follows (with all numbers being in feet).

$$E_{tp}=[(3.2/343+2.5/273+3.8/393+2.4/420)/4]*[(343+273+393+420)/4]=3.025$$

Thus, the true ground-level elevation at the target point can be approximated as 3.025 feet, and this would be expected to be accurate within a fairly small tolerance (e.g., 15%, 10%, or even 5%).

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for generating a ground-level terrain elevation model of a physical area, the system comprising:
   a processor; and
   a machine-readable medium in operable communication with the processor and having instructions stored thereon that, when executed by the processor, perform the following steps:
   receiving a first set of data comprising Lidar-measured elevation data for the physical area;
   determining locations of roadway intersections in the physical area based on a second set of data, as well as the respective Lidar-measured elevation values for the roadway intersections;
   removing or ameliorating any outliers from the Lidar-measured elevation values for the roadway intersections to obtain the ground-level terrain elevation model of the Lidar-measured elevation values for the roadway intersections with outliers removed, thereby giving the ground-level terrain elevation model of the physical area; and
   using, in the ground-level terrain elevation model of the physical area, the Lidar-measured elevation values for a first plurality of roadway intersections nearer to an arbitrary location than other roadway intersections to estimate an elevation value of the arbitrary location within the physical area,
   the estimation of the elevation value of the arbitrary location being performed by weighing Lidar-measured elevation values for the roadway intersections of the first plurality of roadway intersections in reverse proportion to their distances from the arbitrary location.

2. The system according to claim 1, the determining of locations of roadway intersections comprising:
   analyzing streets, of the physical area, using a third set of data comprising streets as respective polylines comprising segments;
   calculating respective distances between pairs of coordinates of vertices selected from the segments of the polylines; and
   determining the locations of roadway intersections based on the respective distances.

3. The system according to claim 1, the instructions when executed further performing the following step:
   determining a ground-level elevation at a target point using Lidar-measured elevation values for a plurality of roadway intersections within a predetermined radius of the target point, the Lidar-measured elevation values being weighted according to respective distances from the target point.

4. The system according to claim 3, the ground-level elevation at the target point ($E_{tp}$) being determined using the following equation:

$$E_{tp}=[(E_1/d_1+ \ldots +E_n/d_n)/n]*[d_1+ \ldots +d_n)/n]$$

where n is the number of roadway intersections within the predetermined radius, $E_1$ is the Lidar-measured elevation value at a first roadway intersection of the plurality of roadway intersections within the predetermined radius, $E_n$ is the Lidar-measured elevation value at an $n^{th}$ roadway intersection of the plurality of roadway intersections within the predetermined radius, $d_1$ is a distance from the first roadway intersection to the target point, and $d_n$ is a distance from the $n^{th}$ roadway intersection to the target point.

5. The system according to claim 4, n being at least 4.

6. The system according to claim 4, the predetermined radius being 1 mile.

7. The system according to claim 1, the removing or ameliorating of any outliers comprising categorizing a Lidar-measured elevation value for a roadway intersection as an outlier if it is higher than a predetermined function of the Lidar-measured elevation values for the roadway intersection by at least a predetermined threshold, the predetermined function being configured to provide an aggregate numeric representation of predominance in a plurality of values.

8. The system according to claim 7, the predetermined function being a median or other average.

9. The system according to claim 7, the predetermined threshold being 200%.

10. The system according to claim 1, the ameliorating comprising determining a ground-level elevation, at a roadway intersection with an outlier Lidar-measured elevation value, using lower nearby Lidar-measured elevation values within a predetermined radius of a center of the roadway intersection with the outlier Lidar-measured elevation value, the predetermined distance being an intersection radius.

11. A method for generating a ground-level terrain elevation model of a physical area, the method comprising:

receiving, by a processor, a first set of data comprising Lidar-measured elevation data for the physical area;

determining, by the processor, locations of roadway intersections in the physical area based on a second set of data, as well as the respective Lidar-measured elevation values for the roadway intersections;

removing or ameliorating, by the processor, any outliers from the Lidar-measured elevation values for the roadway intersections to obtain the ground-level terrain elevation model of the Lidar-measured elevation values for the roadway intersections with outliers removed, thereby giving the ground-level terrain elevation model of the physical area; and using, in the ground-level terrain elevation model of the physical area, the Lidar-measured elevation values for a first plurality of roadway intersections nearer to an arbitrary location than other roadway intersections to estimate an elevation value of the arbitrary location within the physical area, the estimation of the elevation value of the arbitrary location being performed by weighing Lidar-measured elevation values for the roadway intersections of the first plurality of roadway intersections in reverse proportion to their distances from the arbitrary location.

12. The method according to claim 11, the determining of locations of roadway intersections comprising:

analyzing streets, of the physical area, as respective polylines comprising segments;

calculating respective distances between pairs of coordinates of vertices selected from the segments of the polylines; and determining the locations of roadway intersections based on the respective distances.

13. The method according to claim 11, further comprising:

determining a ground-level elevation at a target point using Lidar-measured elevation values for a plurality of roadway intersections within a predetermined radius of the target point, the Lidar-measured elevation values being weighted according to respective distances from the target point.

14. The method according to claim 13, the ground-level elevation at the target point ($E_{tp}$) being determined using the following equation:

$$E_{tp}=[(E_1/d_1+ \ldots +E_n/d_n)/n]*[d_1+ \ldots +d_n)/n]$$

where n is the number of roadway intersections within the predetermined radius, $E_1$ is the Lidar-measured elevation value at a first roadway intersection of the plurality of roadway intersections within the predetermined radius, $E_n$ is the Lidar-measured elevation value at an $n^{th}$ roadway intersection of the plurality of roadway intersections within the predetermined radius, $d_1$ is a distance from the first roadway intersection to the target point, and $d_n$ is a distance from the $n^{th}$ roadway intersection to the target point.

15. The method according to claim 14, n being at least 4, and the predetermined radius being 1 mile.

16. The method according to claim 11, the removing or ameliorating of any outliers comprising categorizing a Lidar-measured elevation value for a roadway intersection as an outlier if it is higher than a predetermined function of the Lidar-measured elevation values for the roadway intersection by at least a predetermined threshold, the predetermined function being configured to provide an aggregate numeric representation of predominance in a plurality of values.

17. The method according to claim 16, the predetermined function being a median or other average.

18. The method according to claim 16, the predetermined threshold being 200%.

19. The method according to claim 11, the ameliorating comprising determining a ground-level elevation, at a roadway intersection with an outlier Lidar-measured elevation value, using lower nearby Lidar-measured elevation values within a predetermined radius of a center of the roadway intersection with the outlier Lidar-measured elevation value, the predetermined distance being an intersection radius.

20. A system for generating a ground-level terrain elevation model of a physical area, the system comprising:

a processor; and a machine-readable medium in operable communication with the processor and having instructions stored thereon that, when executed by the processor, perform the following steps:

receiving a first set of data comprising Lidar-measured elevation data for the physical area;

determining locations of roadway intersections in the physical area based on a second set of data;

determining the respective Lidar-measured elevation values for the roadway intersections;

removing or ameliorating any outliers from the Lidar-measured elevation values for the roadway intersections to obtain the ground-level terrain elevation model of the Lidar-measured elevation values for the roadway intersections with outliers removed;

determining a ground-level elevation at a target point using Lidar-measured elevation values for a plurality of roadway intersections within a predetermined radius of the target point, the Lidar-measured elevation values being weighted according to respective distances from the target point, thereby giving the ground-level terrain elevation model of the physical area; and using, in the ground-level terrain elevation model of the physical area, the Lidar-measured elevation values for a first plurality of roadway intersections nearer to an arbitrary location than other roadway intersections to estimate an elevation value of the arbitrary location within the physical area, the estimation of the elevation value of the arbitrary location being performed by weighing Lidar-measured elevation values for the roadway intersections of the first plurality of roadway intersections in reverse proportion to their distances from the arbitrary location, the determining of locations of roadway intersections comprising:

analyzing streets, of the physical area, as respective polylines comprising segments;

calculating respective distances between pairs of coordinates of vertices selected from the segments of the polylines; and determining the locations of roadway intersections based on the respective distances, the ground-level elevation at the target point ($E_{tp}$) being determined using the following equation:

$$E_{tp}=[(E_1/d_1+ \ldots +E_n/d_n)/n]*[d_1+ \ldots +d_n)/n]$$

where n is the number of roadway intersections within the predetermined radius, $E_1$ is the Lidar-measured elevation value at a first roadway intersection of the plurality of roadway intersections within the predetermined radius, $E_n$ is the Lidar-measured elevation value at an $n^{th}$ roadway intersection of the plurality of roadway intersections within the predetermined radius, $d_1$ is a distance from the first roadway intersection to the target point, and $d_n$ is a distance from the $n^{th}$ roadway intersection to the target point, n being at least 4, the predetermined radius being 1 mile, the removing or ameliorating of any outliers comprising categorizing a Lidar-measured elevation value for a roadway intersection as an outlier if it is higher than a median or other average of the Lidar-measured elevation values for the roadway intersection by at least a predetermined threshold, the predetermined threshold being 200%, and the ameliorating comprising determining a ground-level elevation, at a roadway intersection with an outlier Lidar-measured elevation value, using lower nearby Lidar-measured elevation values within a predetermined radius of a center of the roadway intersection with the outlier Lidar-measured elevation value, the predetermined distance being an intersection radius.

\* \* \* \* \*